United States Patent [19]
Clausen et al.

[11] Patent Number: 5,839,776
[45] Date of Patent: Nov. 24, 1998

[54] STRUCTUAL SUB-ASSEMBLY

[75] Inventors: Edvin List Clausen, Tønder, Denmark; Peter Gundlach, Raufoss, Norway

[73] Assignee: Norsk Hydro a.s., Oslo, Norway

[21] Appl. No.: 786,101

[22] Filed: Jan. 17, 1997

Related U.S. Application Data

[63] Continuation of Ser. No. 507,312, filed as PCT/NO94/00044 Feb. 21, 1994 published as WO94/19227 Sep. 1, 1994, abandoned.

[30] Foreign Application Priority Data

Feb. 22, 1993 [NO] Norway ..................................... 930618

[51] Int. Cl.$^6$ .................................................. B62D 27/00
[52] U.S. Cl. ........................... 216/188; 296/206; 296/205; 296/209; 296/187; 296/29; 280/796; 280/797
[58] Field of Search ....................... 296/29, 30, 194–195, 296/203–205, 209, 188, 189; 280/796, 797

[56] References Cited

U.S. PATENT DOCUMENTS

| | | | |
|---|---|---|---|
| 2,105,713 | 1/1938 | Wordghoff | 280/797 |
| 2,113,399 | 4/1938 | Dietrich. | |
| 3,264,010 | 8/1966 | Pierce. | |
| 4,986,597 | 1/1991 | Clausen | 296/205 |
| 5,201,566 | 4/1993 | Mori | 296/205 X |
| 5,213,386 | 5/1993 | Janotik et al. | 296/29 |
| 5,338,080 | 8/1994 | Janotik et al. | 296/30 |

FOREIGN PATENT DOCUMENTS

| | | | |
|---|---|---|---|
| 568251 | 11/1993 | European Pat. Off. | 296/29 |
| 765 683 | 9/1953 | Germany. | |
| 5338559 | 12/1993 | Japan | 296/194 |
| 90/02680 | 3/1990 | WIPO. | |

*Primary Examiner*—Dennis H. Pedder
*Attorney, Agent, or Firm*—Wenderoth, Lind & Ponack

[57] ABSTRACT

A structural assembly at a front or rear of a vehicle frame includes a longitudinal member extending in a longitudinal direction of the frame. The longitudinal member has a part that extends at an angle to such longitudinal direction. A transverse member extends transversely of the longitudinally direction and includes a straight central part and an end part extending at an angle to the straight central part and at an angle to the longitudinal direction of the frame that is substantially equal to the angle of the part of the longitudinal member. The part of the longitudinal member and the end part of the transverse member are aligned and joined to form a nested joint that extends at the angle to the longitudinal direction of the frame. A side member extends in the longitudinal direction of the frame, and the nested joint is joined to the side member, thus forming a triple joint connection between the longitudinal, transverse and side members.

9 Claims, 4 Drawing Sheets

STRUCTUAL SUB-ASSEMBLY

This application is a continuation of now abandoned application, Ser. No. 08/507,312, filed as PCT/NO94/00044 Feb. 21, 1994 published as WO94/19227 Sep. 1, 1994.

BACKGROUND OF THE INVENTION

The present invention relates to a structural subassembly of a vehicle body or body frame, and more particularly to an improved joint between longitudinally extending structural members and interconnected transverse members in such assembly, e.g. the front structure or rear of a vehicle.

Conventionally such assemblies, comprising e.g. longitudinal front or rear members and transversely extending cross members in a vehicle frame, are provided by welding of the members, or are combined use of special adapted connectors, e.g. castings, and welding, in order to reinforce the joint area of the members joined at a substantially right angle. However, these joints, exposed to large impact forces in the event of a front or rear collision of the vehicle, do not always give an adequate support to the front and rear members, respectively, during such a collision. Typically, the longitudinal front/rear members prior to joining to a side member will achieve a curved (bent) configuration in order to accommodate the front/rear vehicle wheel. Such bent area of the members has an inherent tendency to extensive buckling during collision and consequently represents a danger of joint rupture with penetration of the buckled/loosened members into the passenger cabin and resultant injury hazard for the occupants of the vehicle.

SUMMARY OF THE INVENTION

It is therefore an object of the present invention to provide a novel reinforced assembly of the longitudinal and transverse structural members avoiding the above disadvantages inherent to previously known joints and avoiding danger of excessive buckling of the longitudinal members in case of collision.

A further object of the invention is to provide an assembly ensuring a better distribution of the load between the longitudinal and transverse members in case of a front or rear collision.

The above and other objects are achieved in accordance with the present invention by provision of a new structural assembly comprising longitudinally extending members and interconnected transverse members, the members being joined by means of longitudinally nested joints formed by bending of the end parts of the transverse members and alignment thereof with complementary shaped longitudinal members.

In a particularly advantageous embodiment of the assembly according to the present invention the longitudinally nested joints exhibit a varied dimension over their extension.

BRIEF DESCRIPTION OF THE DRAWINGS

Other objects, specific features and advantages of the present invention will be apparent from the following detailed description of preferred embodiments with reference to the accompanying drawings, wherein.

DETAILED DESCRIPTION OF THE INVENTION

Figure 1:
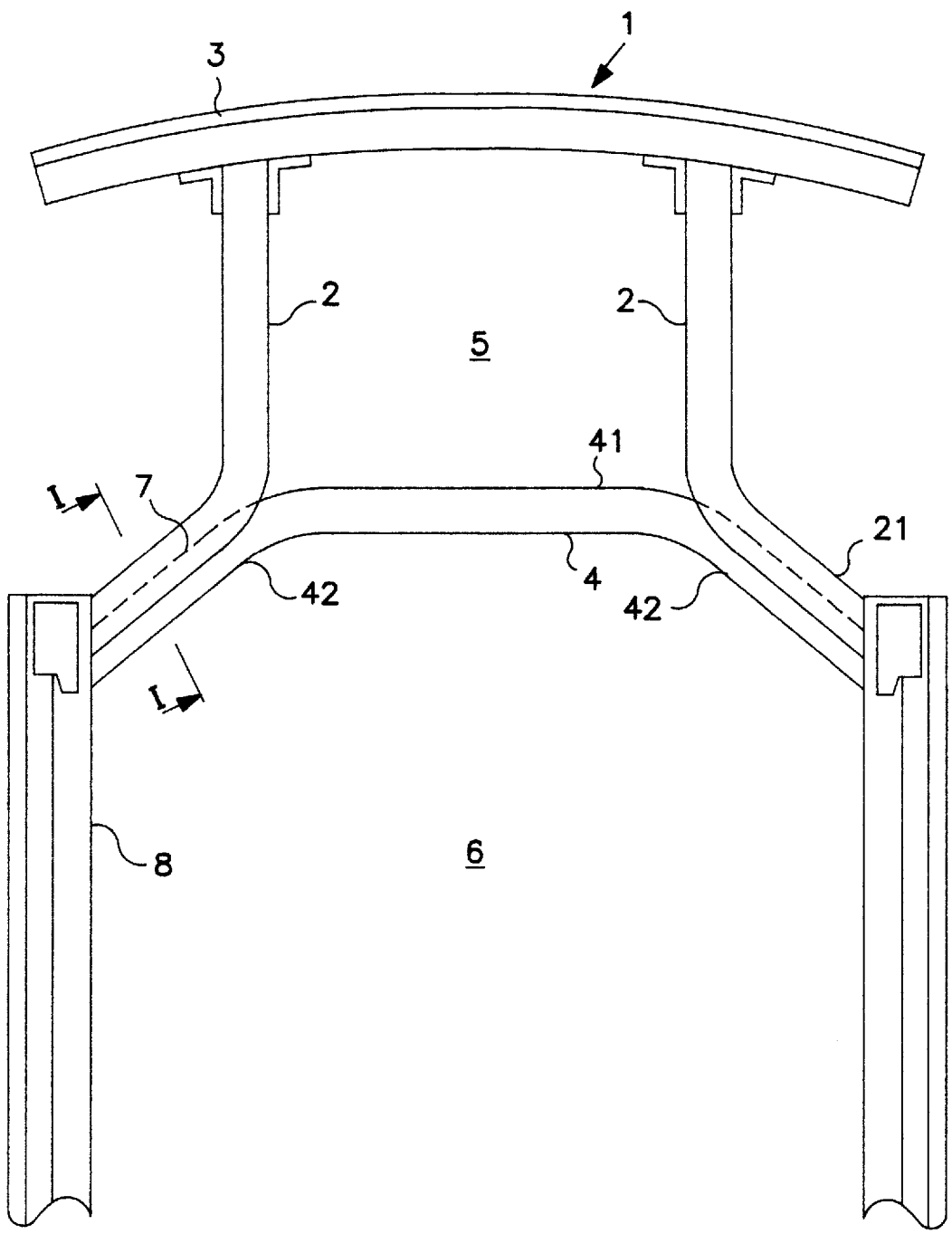
FIG. 1 is a schematic partial top view of an assembly of the present invention.

Referring to the drawings and particularly to FIG. 1 which is a schematic partial top view, a sub-assembly 1 in the form of a front structure of a vehicle body frame includes a pair of substantially parallelly and longitudinally extending front members 2 attached to a transversely extending bumper 3 and a cross member 4 delimiting an engine area (space) 5 from a passenger cabin 6 of a vehicle.

The cross member 4 includes a substantially straight part 41 extending between opposite end parts 42. Each end part 42 is bent at an angle to part 41 and is parallel to and aligned with a bent rear part 21 of a respective longitudinal front member 2. Longitudinally nested joints 7 between the respective longitudinal members 2 and transverse cross members 4 are achieved due to complementary shaped, typically extruded members and/or partial removal of adjacent walls of members 2, 4 over a joining area therebetween.

Connection between the members is further secured by any conventional means, e.g. welding, and this applied also for connection of the sub-assembly (front/rear structure) 1 to a side member (sill) 8 of the vehicle frame, thus ensuring an optimal integral triple joint interconnection between the side member 8, the front/rear member 2 and the transverse cross member 4. This particular configuration of the joints ensures a significant reinforcing of the longitudinal members and thus relief for impact forces so that buckling and possible rupture of the connection is avoided due to distribution of load between the longitudinal and transverse members.

Figure 2:
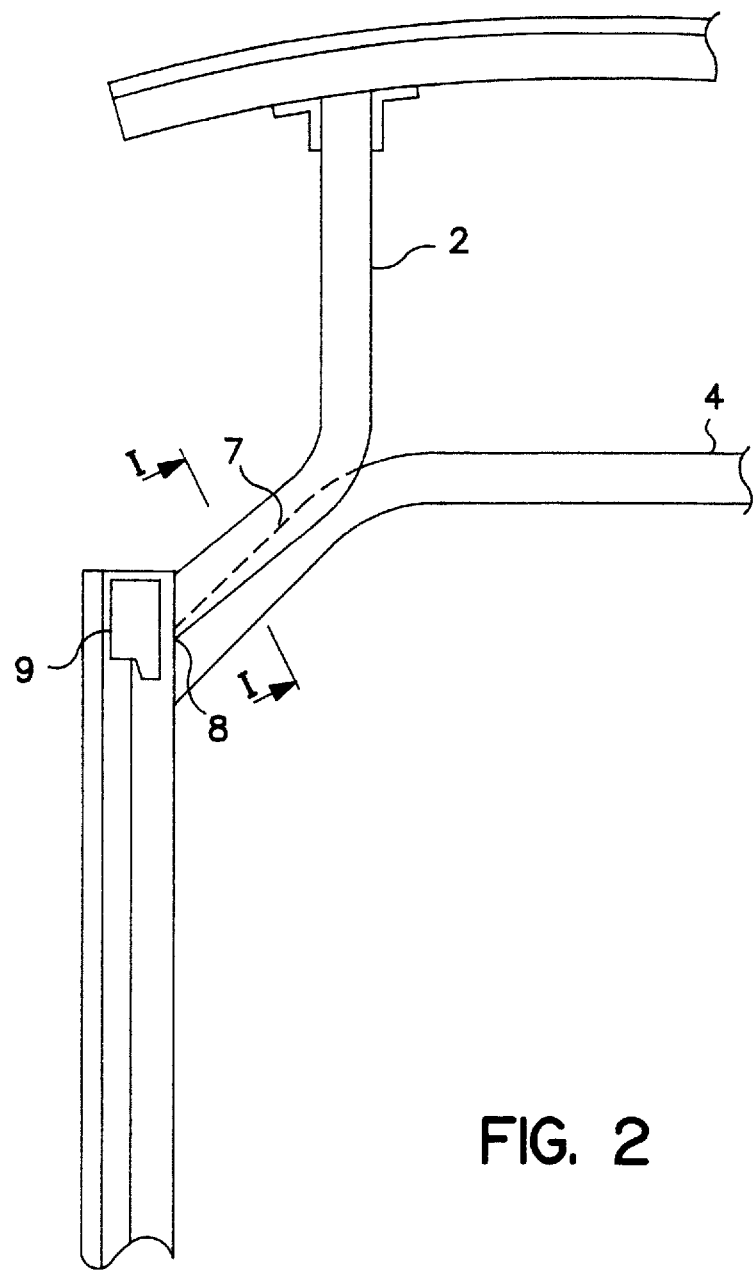
FIG. 2 is a schematic partial top view of a particular embodiment of the assembly.

FIG. 2 illustrates schematically in a partial broken top view a particularly advantageous embodiment of the assembly. The longitudinally nested joint 7 between the cross member 4 and front member 2 provides an increased dimension in the longitudinal direction in the area of joining with side member 8 and an A-post 9 vertically extending from the side member. In this way an optimal reinforced joint between the members 2, 4, 8 is achieved having the largest cross-section and contact area to the side member where the load under collision is largest. Furthermore, this optimized arrangement/configuration of the joint also provides more space in the area of the passenger cabin where it is needed for displacement of operating/control devices (clutch, brake, gas foot peddles).

FIGS. 3–7 are cross-sectional views taken along line I—I in FIGS. 1 or 2 and show various configurations of nested longitudinal and transverse members 2 and 4, both members being typically provided as closed shapes (box sections) extruded of light metal, e.g. aluminum or Al-alloys.

Figure 3:
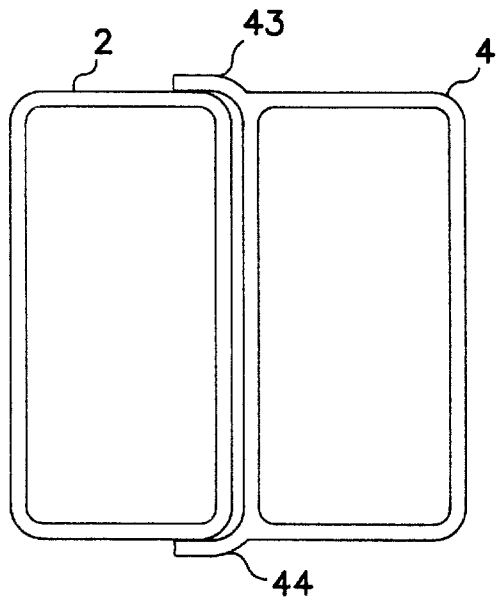
FIGS. 3–7 are cross-sectional views of various configurations of structural members employable in the present invention.

FIG. 3 shows a side by side arrangement of the joined members 2, 4 where the cross member 4 partially encompasses the front member 2 by means of outwardly longitudinally extending flanges 43, 44. Both members are provided as closed shapes.

Figure 4:
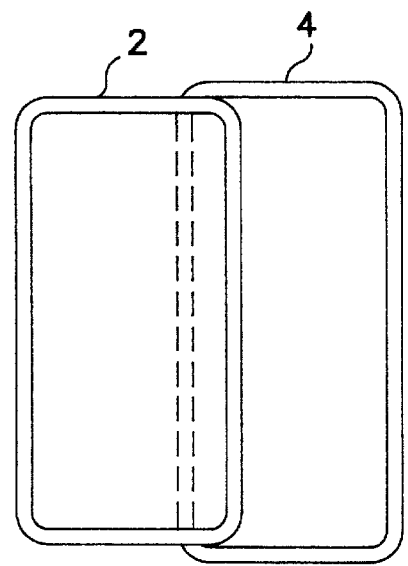
Figure 5:
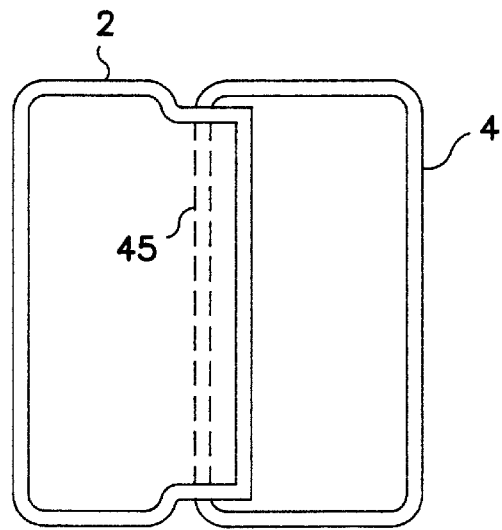

FIGS. 4 and 5 show two alternative embodiments of the above arrangement illustrating a single chamber cross member 4 accommodating the front member 2 by partial removal of an adjacent wall of member 4 over a predetermined extension of the joint.

Figure 6:
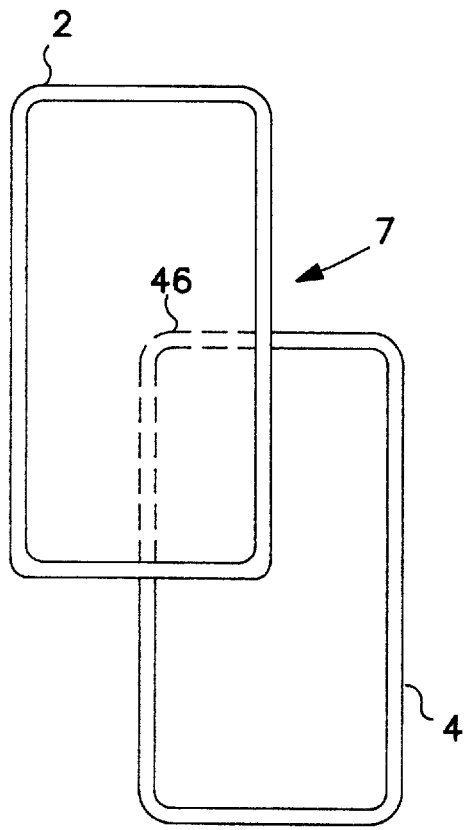

Another particular configuration of the nested joint 7 between the members 2, 4 is schematically shown in FIG. 6. The members are arranged in a relatively vertically and horizontally staggered pattern. The cross-member 4 has a partially removed corner wall part 46 in order to accommodate the front member 2 over the joint extension. The cross member 4 could in a similar way be positioned above front member 2.

Figure 7:
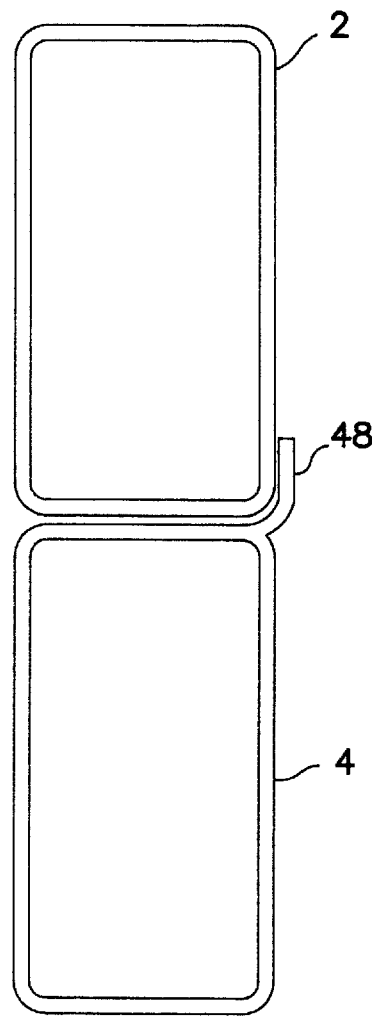

FIG. 7 shows finally another embodiment of the longitudinally nested joint 7 by a vertical arrangement of the members 2, 4 provided as single chamber box shapes, the "bearing" cross-member 4 having a supporting longitudinal flange 48.

Although the present invention has been described and illustrated with respect to preferred features and embodiments thereof, it is contemplated that various changes and modifications may be made to the specifically described and illustrated arrangements/configurations of the assembly, joints and applied members without departing from the scope of the present invention.

We claim:

1. A structural assembly at a front or rear of a vehicle frame, said assembly comprising:

a longitudinal member extending in a longitudinal direction of said vehicle frame, said longitudinal member having a part extending at an angle to said longitudinal direction;

a transverse member extending transversely of said longitudinal direction, said transverse member including a central part and an end part extending angularly relative to said central part and extending to said longitudinal direction at an angle substantially equal to said angle of said part of said longitudinal member;

said part of said longitudinal member and said end part of said transverse member being aligned and joined to form a nested joint that extends at said angle to said longitudinal direction;

a side member extending in said longitudinal direction of said vehicle frame; and said part of said longitudinal member and said end part of said transverse member of said nested joint extending toward and being joined to said side member, thereby forming a triple joint connection between said longitudinal member, said transverse member and said side member, with said nested joint providing distribution of load between said longitudinal and transverse members.

2. A structural assembly as claimed in claim 1, wherein said nested joint has a dimension that increases in a direction toward said side member.

3. A structural assembly as claimed in claim 1, wherein said part of said longitudinal member and said end part of said transverse member are aligned horizontally at said nested joint.

4. A structural assembly as claimed in claim 1, wherein said part of said longitudinal member and said end part of said transverse member are aligned vertically at said nested joint.

5. A structural assembly as claimed in claim 1, wherein said part of said longitudinal member and said end part of said transverse member are relatively staggered horizontally and vertically at said nested joint.

6. A structural assembly as claimed in claim 1, wherein one of said part of said longitudinal member and said end part of said transverse member have at least one flange partially nesting the other of said part of said longitudinal member and said end part of said transverse member at said nested joint.

7. A structural assembly as claimed in claim 1, wherein one of said part of said longitudinal member and said end part of said transverse member has a portion of a wall thereof removed adjacent the other of said part of said longitudinal member and said end part of said transverse member at said nested joint.

8. A structural assembly as claimed in claim 1, wherein said longitudinal member and said transverse member comprise extruded closed members.

9. A structural assembly as claimed in claim 1, wherein said central part of said transverse member is rectilinear.

* * * * *